United States Patent
Yamaguchi et al.

(10) Patent No.: US 9,599,171 B2
(45) Date of Patent: Mar. 21, 2017

(54) ONE-WAY CLUTCH AND SHEET FEEDING ROLLER

(71) Applicant: CANON KABUSHIKI KAISHA, Tokyo (JP)

(72) Inventors: Yoshimasu Yamaguchi, Kawasaki (JP); Takashi Uno, Noda (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/661,213

(22) Filed: Mar. 18, 2015

(65) Prior Publication Data
US 2015/0275987 A1 Oct. 1, 2015

(30) Foreign Application Priority Data
Mar. 28, 2014 (JP) .................... 2014-068281

(51) Int. Cl.
*F16D 41/07* (2006.01)
*F16D 41/06* (2006.01)
(Continued)

(52) U.S. Cl.
CPC .......... *F16D 41/06* (2013.01); *B65H 5/06* (2013.01); *F16D 43/202* (2013.01); *F16D 2041/0605* (2013.01)

(58) Field of Classification Search
CPC ... B65H 3/06; B65H 3/32; B65H 3/34; B65H 3/46; B65H 3/56; B65H 3/0684;
(Continued)

(56) References Cited

U.S. PATENT DOCUMENTS 3,861,506 A 1/1975 Dossier
5,103,950 A * 4/1992 Ito .................... F16D 43/14
180/248

(Continued)

FOREIGN PATENT DOCUMENTS

CN 1392934 A 1/2003
CN 174264 A 1/2006
(Continued)

OTHER PUBLICATIONS

Chinese Office Action issued in corresponding Chinese Patent Application No. 201510137662.8 dated Dec. 29, 2016.

*Primary Examiner* — Thomas Morrison
(74) *Attorney, Agent, or Firm* — Fitzpatrick, Cella, Harper & Scinto

(57) ABSTRACT

A one-way clutch includes: an inner ring provided with an inserting opening for permitting insertion of a rotation shaft and rotatable integrally with the rotation shaft by being engaged with the rotation shaft; an outer ring engaged with an outer peripheral surface of the inner ring and rotatable in one direction relative to the inner ring and non-rotatable in a direction opposite to the one direction; and an elastic metal plate member, engaged with the inner ring, for limiting movement of the inner ring relative to the outer ring in a rotational axis direction of the outer ring. When the rotation shaft is mounted in the inner ring, the elastic metal plate member includes a leaf spring portion positioned and elastically deformable in a gap between the rotation shaft and the inner ring.

6 Claims, 11 Drawing Sheets

(51) Int. Cl.
*B65H 3/06* (2006.01)
*B65H 5/06* (2006.01)
*F16D 43/202* (2006.01)

(58) Field of Classification Search
CPC .... F16D 41/07; F16D 41/066; F16D 41/0665; F16D 41/16; F16D 41/06
See application file for complete search history.

(56) References Cited

U.S. PATENT DOCUMENTS

| | | | |
|---|---|---|---|
| 5,653,433 A * | 8/1997 | Ishizuka | B65H 3/5223 271/121 |
| 5,697,604 A * | 12/1997 | Tanaka | B65H 3/5223 271/121 |
| 6,880,822 B2 | 4/2005 | Fukushima et al. | |
| 6,955,251 B2 | 10/2005 | Kurita et al. | |
| 7,182,336 B2 | 2/2007 | Fukushima et al. | |
| 7,182,337 B2 | 2/2007 | Sasai et al. | |
| 7,267,213 B2 * | 9/2007 | Demura | F16D 41/07 188/82.8 |
| 9,074,644 B2 | 7/2015 | Sato et al. | |
| 2005/0062216 A1 * | 3/2005 | Fukushima | B65H 1/022 271/117 |
| 2015/0147116 A1 | 5/2015 | Pahlich | |
| 2015/0240896 A1 | 8/2015 | Sato et al. | |
| 2015/0240897 A1 | 8/2015 | Sato et al. | |
| 2015/0240898 A1 | 8/2015 | Sato et al. | |
| 2015/0300435 A1 | 10/2015 | Sato et al. | |

FOREIGN PATENT DOCUMENTS

| | | |
|---|---|---|
| CN | 102803774 A | 11/2012 |
| GB | 753388 A | 7/1956 |
| JP | 63-17740 * | 1/1988 |
| JP | H06-18735 U | 3/1994 |
| JP | H7-42766 A | 2/1995 |
| JP | 3040941 B2 | 5/2000 |
| JP | 2006-220280 A | 8/2006 |
| WO | 2013/178340 A2 | 12/2013 |

* cited by examiner (a)

(b)

(a)

(b)

(a) 
(b)

(a)

(b)

(a)

(b)

(c)

(a)

(b)

ONE-WAY CLUTCH AND SHEET FEEDING ROLLER

FIELD OF THE INVENTION AND RELATED ART

The present invention relates to a one-way clutch for idling relative rotation in a reverse direction between an inner ring for holding a rotation shaft inserted therein and an outer ring including a one-direction rotation-preventing rotatable member while transmitting the relative rotation in a normal direction.

A one-way clutch such that a plurality of rotatable members are provided with respect to a circumferential direction between an inner ring holding a rotation shaft and an outer ring and then relative rotation between the inner ring and the outer ring in a reverse direction is idled while transmitting the relative rotation in a normal direction has been widely used (Japanese Laid-Open Patent Application (JP-A) Hei 7-42766).

As shown in JP-A Hei 7-42766, in the case where the rotation shaft is inserted in the inner ring, there is a need to mount a relative rotation-preventing member, such as a pin, a key or the like, between the rotation shaft and the inner ring. Alternatively, there is a need to prevent the relative rotation between the rotation shaft and the inner ring by using a relative rotation-preventing insertion structure such as a spline.

In the case where the relative rotation-preventing member independent of the inner ring is provided between the rotation shaft and the inner ring, in addition to an increase in number of parts, there is a problem that the number of assembling steps is increased. There is also a possibility of a forgotten mounting of the member. On the other hand, in the case of forming the spline, the number of parts is not increased, but there is a problem that a processing cost of the inner ring and the rotation shaft is remarkably increased.

SUMMARY OF THE INVENTION

A principal object of the present invention is to provide a one-way clutch capable of suppressing jerking of an inner ring and a rotation shaft with respect to a relative rotation direction with a low cost without providing a relative rotation-preventing member independent of the inner ring.

According to an aspect of the present invention, there is provided a one-way clutch comprising: an inner ring provided with an inserting opening for permitting insertion of a rotation shaft and rotatable integrally with the rotation shaft by being engaged with the rotation shaft; an outer ring engaged with an outer peripheral surface of the inner ring and rotatable in one direction relative to the inner ring and non-rotatable in a direction opposite to the one direction; and an elastic metal plate member, engaged with the inner ring, for limiting movement of the inner ring relative to the outer ring in a rotational axis direction of the outer ring, wherein when the rotation shaft is mounted in the inner ring, the elastic metal plate member includes a leaf spring portion positioned and elastically deformable in a gap between the rotation shaft and the inner ring.

These and other objects, features and advantages of the present invention will become more apparent upon a consideration of the following description of the preferred embodiments of the present invention taken in conjunction with the accompanying drawings.

DESCRIPTION OF THE EMBODIMENTS

Embodiments of the present invention will be specifically described with reference to the drawings.

Embodiment 1

Figure 1:
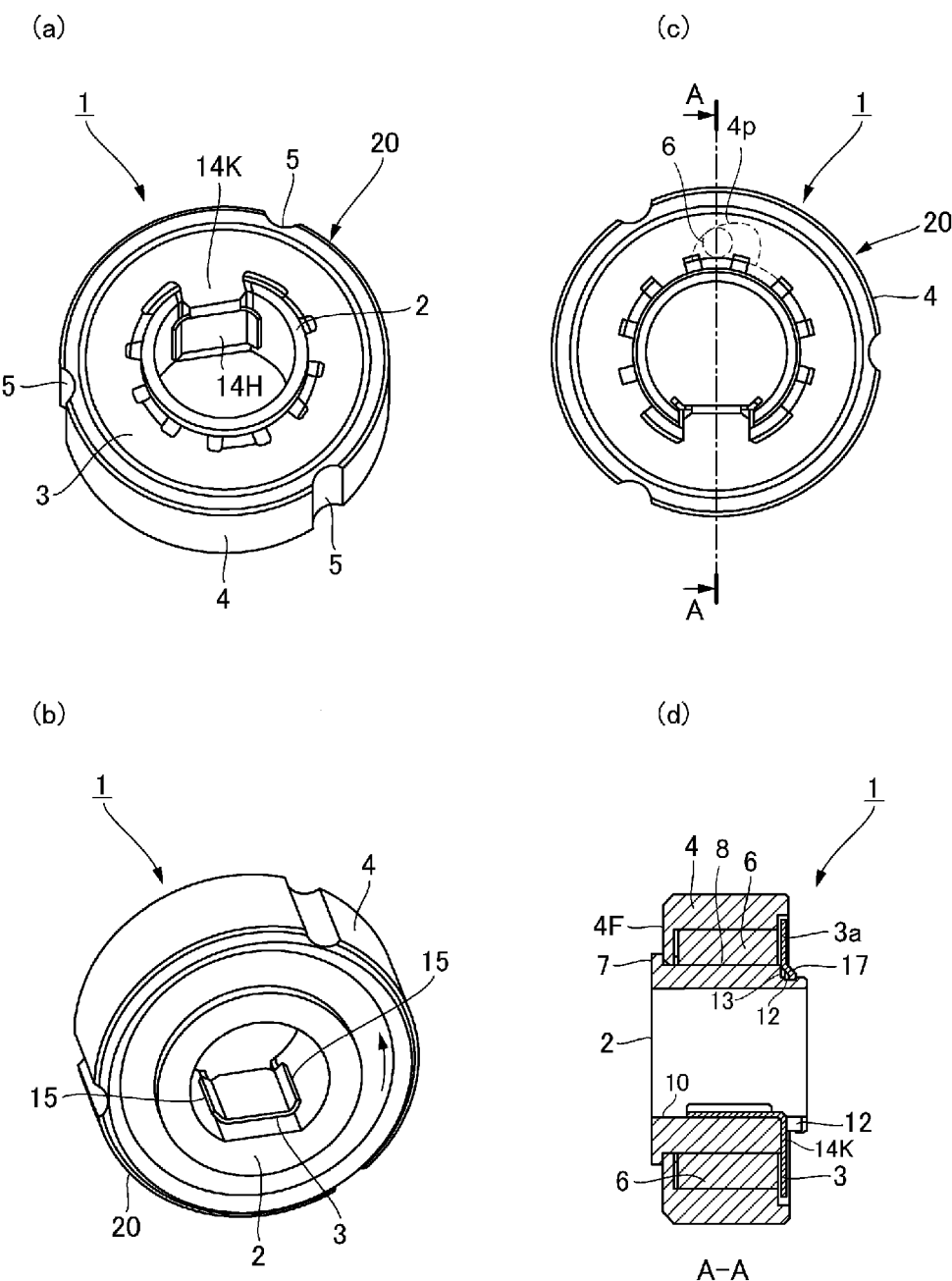
In FIG. 1, (a) and (b) are perspective views of a one-way clutch in Embodiment 1, (c) is a front view of the one-way clutch, and (d) is a sectional view of the one-way clutch.
Figure 2:
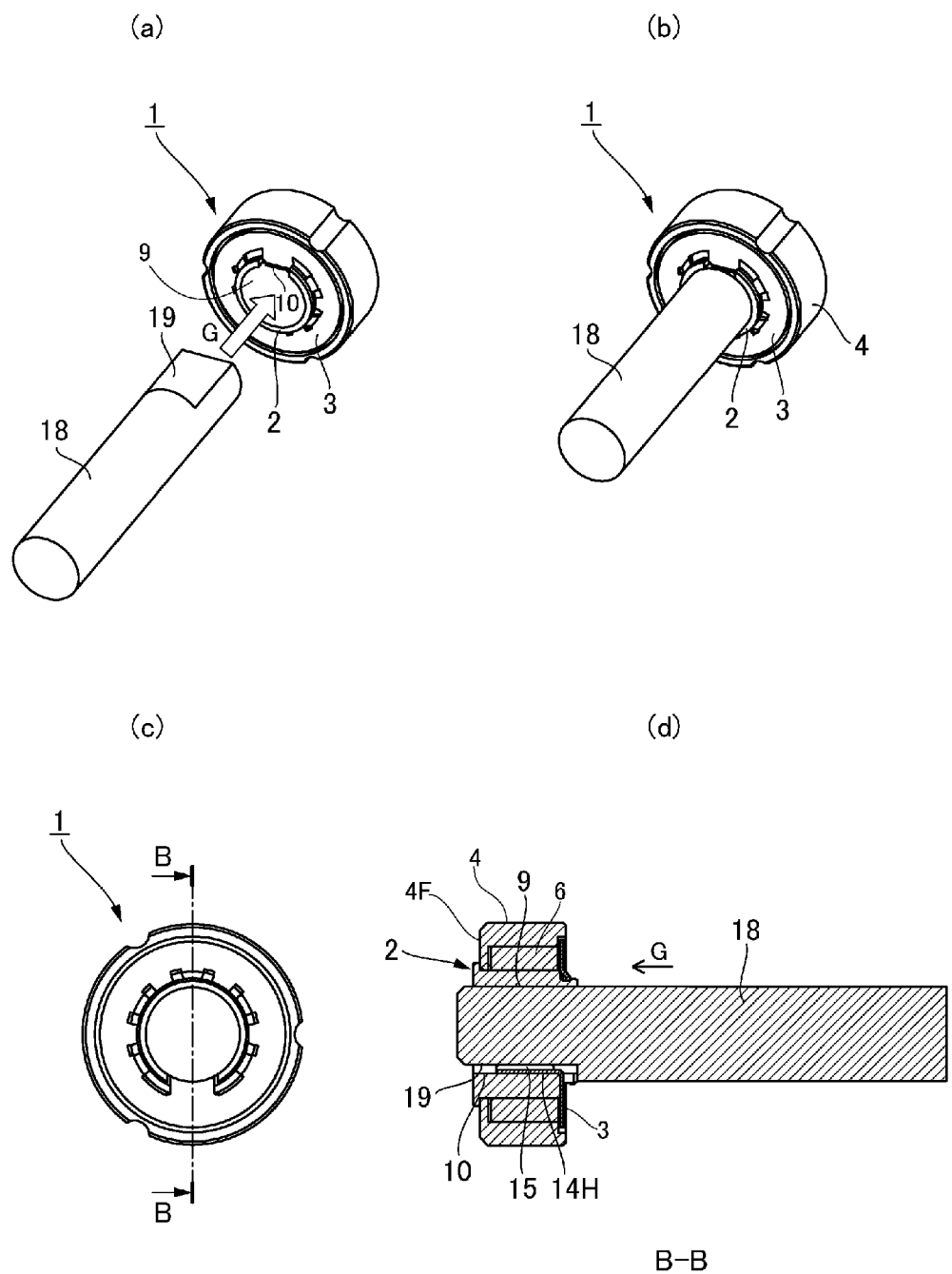
In FIG. 2, (a) to (d) are illustrations of mounting of the one-way clutch around a rotation shaft in Embodiment 1.
Figure 3:
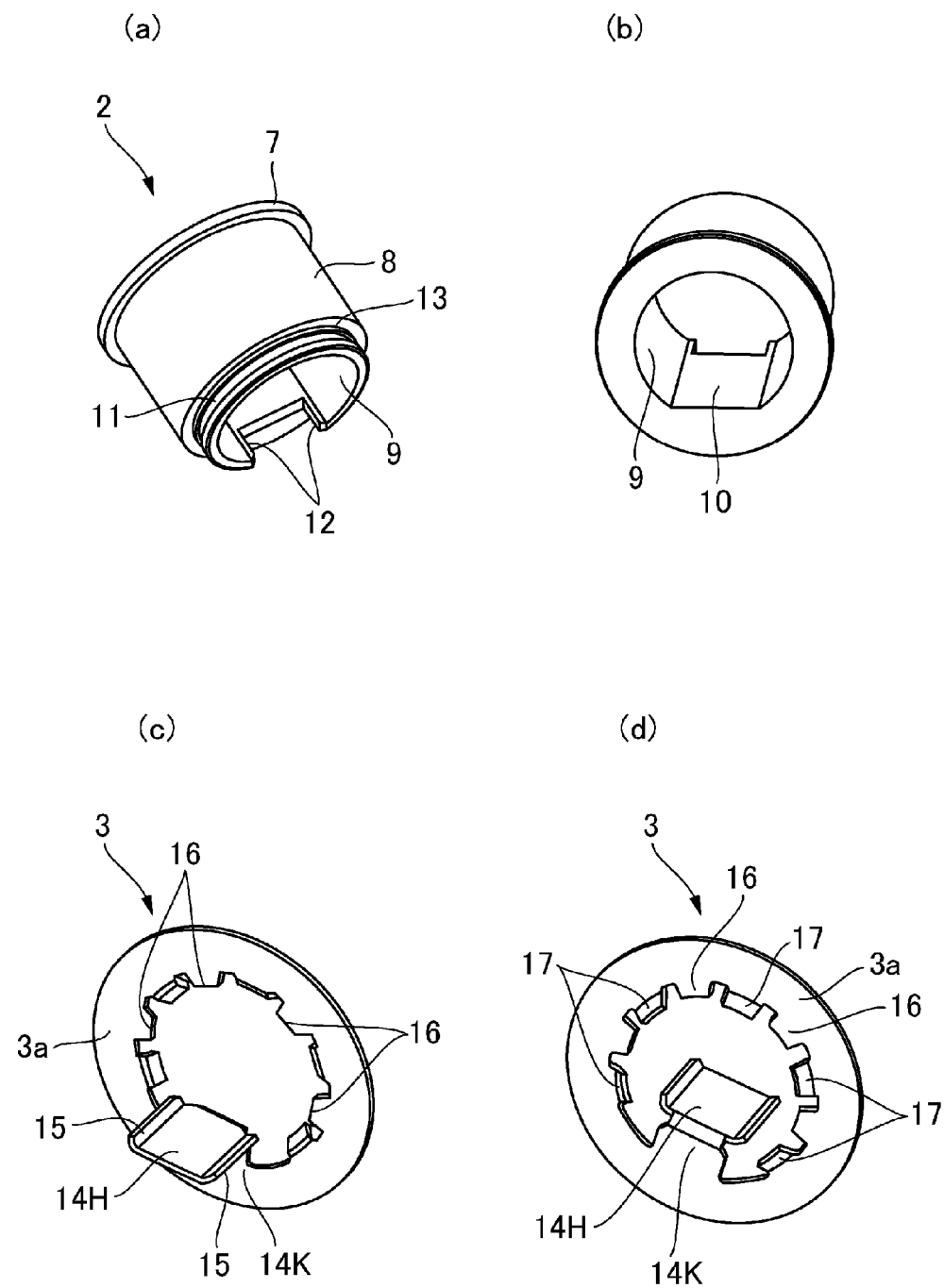
In FIG. 3, (a) and (b) are perspective views of an inner ring, and (c) and (d) are perspective views of an outer ring side plate in Embodiment 1.
Figure 4:
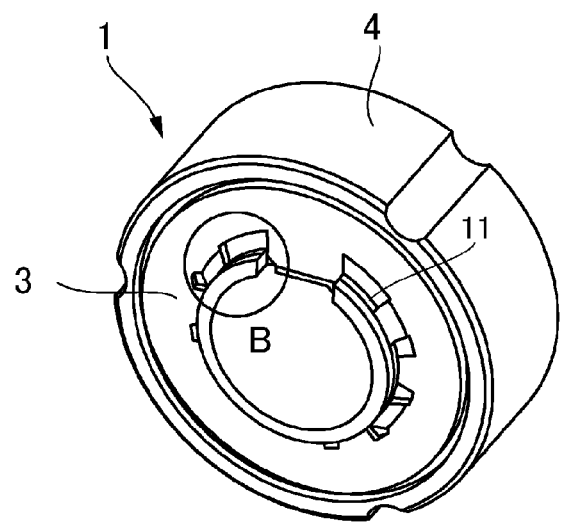
In FIG. 4, (a) is a perspective view showing a locking portion of the inner ring and the outer ring side plate, and (b) is an enlarged view of the locking portion in Embodiment 1.
Figure 4:
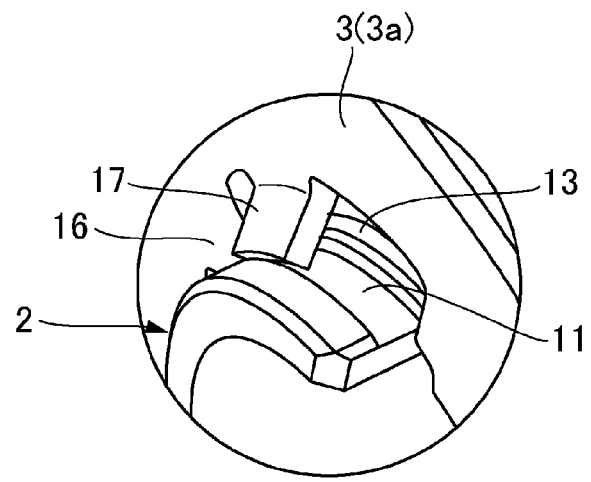
Figure 5:
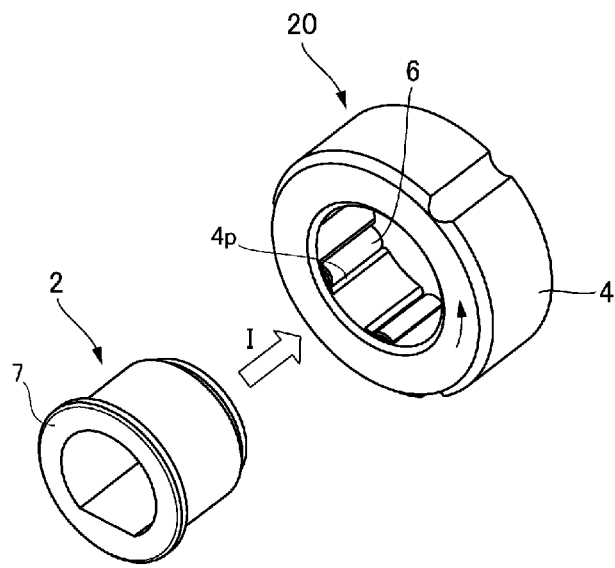
In FIG. 5, (a) and (b) are illustrations of an assembling procedure of the one-way clutch in Embodiment 1.
Figure 5:
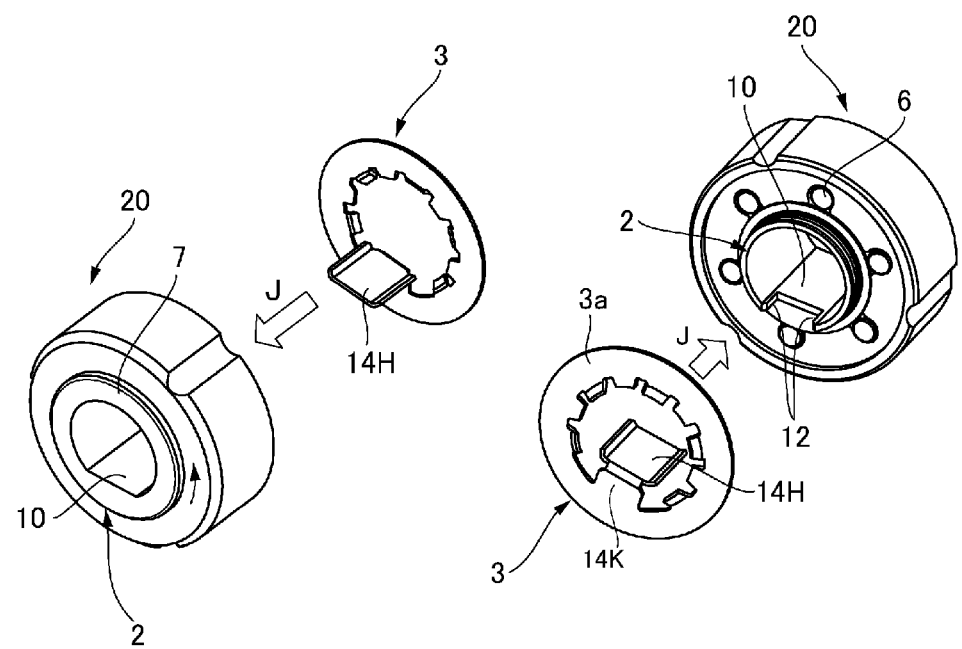

In FIG. 1, (a) and (b) are perspective views of a one-way clutch in Embodiment 1, (c) is a front view of the one-way clutch, and (d) is a sectional view of the one-way clutch. In FIG. 2, (a) to (d) are illustrations of mounting of the one-way clutch around a rotation shaft in Embodiment 1. In FIG. 3, (a) and (b) are perspective views of an inner ring, and (c) and (d) are perspective views of an outer ring side plate in Embodiment 1. In FIG. 4, (a) is a perspective view showing a locking portion of the inner ring and the outer ring side plate, and (b) is an enlarged view of the locking portion in Embodiment 1. In FIG. 5, (a) and (b) are illustrations of an assembling procedure of the one-way clutch in Embodiment 1.

As shown in (a) to (d) of FIG. 1, a one-way clutch 1 includes an outer ring (outer race) 4 inside of which a needle 6 is provided, and an inner ring (inner race) 2 provided inside the needle 6. As the outer ring 4 and the needle 6, a one-way unit 20 ("OWC-GXZ", manufactured by Origin Electric Co., Ltd.) was used. The one-way unit 20 is of a roller type or a needle type in general, in which a pocket portion 4p having a wedge-shaped inclined surface is provided at each of a plurality of angular positions into which an inner peripheral surface of the outer ring 4 is equally divided with respect to a circumferential direction, and the needle 6 is disposed inside the pocket portion 4p. In the outer ring 4, the needle 6 moves in the pocket 4p in the circumferential direction by a minute distance, so that relative rotation between the outer ring 4 and the inner ring 2 in a reverse direction is prevented while permitting the relative rotation in a normal direction. In (c) of FIG. 1, the pocket portion 4p is illustrated in an exaggerated manner compared with (b) of FIG. 5. Design data of the one-way unit 20 is published at "<http://www.origin.co.jp/product/up_file/ja/201408145.pdf>".

At the pocket portion 4p of the outer ring 14, the cam surface for supporting the needle 6 is formed. The needle 6 is disposed in a wedge-shaped space between the cam surface and an inner peripheral surface 8 of the inner ring 2, and is urged in a narrowing direction of the wedge-shaped space by an unshown urging member such as a compression spring, a leaf spring or a resin spring. The needle 6 urged by the urging member contacts the cam surface of the outer ring 4 and the inner ring 2, so that the needle 6 is held in a fixed position at the pocket portion 4p.

When the outer ring 4 is intended to be rotated relative to the inner ring 2 in certain one direction, a contact (bearing) pressure between the needle 6 and the cam surface which is an inclined surface of the wedge-shaped space becomes high, so that a cam resistance generates, and thus power is transmitted from the outer ring 4 to the inner ring 2. When the outer ring 4 is intended to be rotated relative to the inner ring 2 in a reverse direction (opposite to the certain one direction), the contact pressure between the needle 6 and the cam surface becomes low, so that the needle 6 and the inner ring 2 slide with each other, and thus power transmission is eliminated.

(Outer Ring)

As shown in (a) to (d) of FIG. 1, the one-way unit 20 is a general-purpose product capable of accuracy assurance as a unit. In Embodiment 1, separately manufactured metal-made inner ring 2 and thin metal plate-made roller side plate 3 were assembled with the one-way unit 20. The outer peripheral surface of the inner ring 2 was set to provide transmission fit with a fit tolerance so as to be engaged with the rotation shaft 18. The outer ring side plate 3 is mounted on an end portion of the inner ring 2, so that the one-way clutch 1 is assembled.

However, a manufacturing method of the one-way unit 20 is not limited thereto. The one-way unit 20 is easily manufactured in general in industrial production, and similar products are produced and sold by several companies. The one-way unit 20 itself may also be manufactured originally.

On the outer peripheral surface of the outer ring 4, in order to prevent sliding relative rotation between the outer ring 4 and a gear 4G (FIG. 11) which is an outside mating member into which the outer ring 4 is to be inserted, a recessed groove 5 is formed in three positions.

As shown in (d) of FIG. 1, the outer ring 4 includes a flange 4F for limiting movement of the needle 6 in a rotational axis direction. The flange 4F contacts a flange portion 7 of the inner ring 2 and slides with the flange portion 7 with the relative rotation between the roller 4 and the inner ring 2. For this reason, the outer ring 4 is formed of sintered metal of a metal powder material. Lubricity is enhanced by penetrating a porous space of a porous texture of the sintered metal with a lubricant. The material for the outer ring 4 contains a sliding property-improving component.

As described above, the outer ring 4 engages with the outer peripheral surface of the inner ring 2, so that the outer ring 4 is rotatable relative to the inner ring 2 in one direction and is not rotatable relative to the inner ring 2 in a direction opposite to the one direction.

(Inner Ring)

As shown in (a) to (d) of FIG. 2, at an end portion of the rotation shaft 18, a flat surface 19 is formed. The inner ring 2 has a flat surface 10. The flat surface 10 forms a gap between itself and the flat surface 19 when the end portion of the rotation shaft 18 is inserted in the inner ring 2. Between the flat surface 10 of the inner ring 2 and the flat surface 19 of the rotation shaft 18, a certain clearance is formed by high-accuracy dimension setting. The flat surface 19 is formed by partly cutting a cross section perpendicular to an axis of the rotation shaft 18 in a flat shape, thus forming a resulting portion in a D-shape.

As shown in (a) and (b) of FIG. 3, the inner ring 2 is provided with a hole for engaging with and holding the rotation shaft 18 so as to be concentric with an outer peripheral surface 8 thereof. An inner peripheral surface 9 of the inner ring 2 is finished in a diameter defined in a transition fit dimension with a fit tolerance.

As shown in (a) and (b) of FIG. 3, the outer peripheral surface of the inner ring 2 is finished in a diameter defined in a transition fit dimension with a fit tolerance. Correspondingly to the flat surface 19 of the rotation shaft 18, the flat surface 10 is formed at the inner peripheral surface 9 of the inner ring 2 so as to mate with the flat surface 19. As shown in (a) of FIG. 2, the rotation shaft 18 is mounted by positioning the flat surface 10 in an opposing position to the flat surface 19, so that rotation of the rotation shaft 18 relative to the inner ring 2 is limited.

The inner ring 2 includes the flange portion 7, the outer peripheral surface 8 and the inner peripheral surface 9. As shown in (d) of FIG. 1, the flange portion 7 abuts against the outer ring 4, so that disengagement of the inner ring 2 from the outer ring 4 with respect to a thrust direction is prevented. The outer peripheral surface 8 contacts the needle 6. As shown in (a) of FIG. 2, the rotation shaft 8 as a member-to-be-mounted is inserted into the inner peripheral surface 9.

As shown in (a) of FIG. 3, the inner ring 2 includes a retaining groove portion 11, a leaf spring guiding portion 12 and a guide receiving portion 13. As shown in (d) of FIG. 1, the roller side plate 3 engages with the retaining groove portion 11 to cover one of side surfaces of the outer ring 4, so that disengagement of the needle 6 is prevented.

As described above, the rotation shaft 18 has the flat surface 19 which is an example of a rotation shaft formed in a flat shape at a part of a circumferential surface thereof. The inner ring 2 is provided with a non-circular inserting opening (hole). The inner ring 2 has the flat surface 10 which is an example of an inner ring flat surface formed in a flat shape at a part of a circumferential surface thereof engageable with the circumferential surface of the rotation shaft 18. When the rotation shaft 18 is inserted into and engaged with the inner ring 2, a gap is formed between the flat surfaces 19 and 10.

(Outer Ring Side Plate)

As shown in (c) and (d) of FIG. 3, the outer ring side plate 3 is formed by subjecting a leaf spring material, such as a stainless steel plate (SUS 304 CSP), a phosphor bronze plate or a beryllium plate which are used for a thin plate spring, to press working, and then a spring property is reinforced by heat treatment. The outer ring side plate 3 is a flexible elastic member, and therefore is mounted outside the inner ring 2, so that movement of the outer ring 4 and the rotation shaft 18 in the rotational axis direction is limited. An inner ring inserting portion 14H contacts the flat surface 10 of the inner ring 2. A leaf spring portion 15 is formed by being bent from the inner ring inserting portion 14H, and a free end thereof is contacted to the flat surface 19 of the rotation shaft 18 which is an opposing mating component.

The outer ring side plate 3 is provided with a leaf spring base portion 1K in an inner peripheral surface-side of a ring-shaped side plate portion 3a. The inner ring inserting portion 14H of the outer ring side plate 3 is formed by bending the leaf spring base portion 14K in a free end side. The leaf spring portion 15 of the outer ring side plate 3 is formed by obliquely bending both end portions of the inner ring inserting portion 14H with respect to a direction along the inner peripheral surface 9 of the inner ring 2. At least one of the end portions of the inner ring inserting portion 14H parallel to a diameter direction of the inner ring 2 is bent and formed as the leaf spring portion 15.

Figure 10:
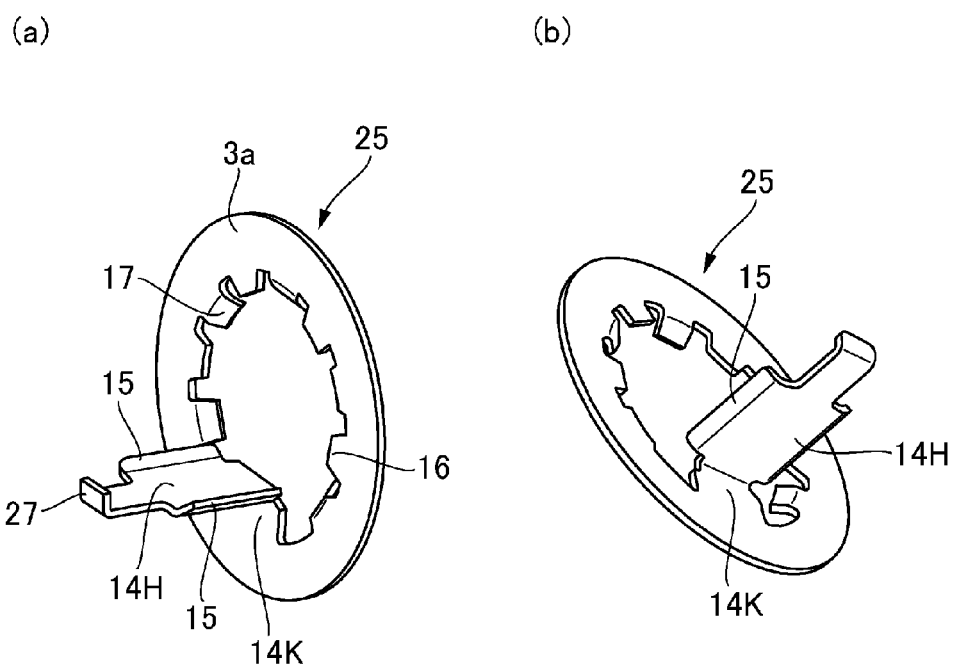
In FIG. 10, (a) and (b) are illustrations of an outer ring side plate in Embodiment 4.

As shown in FIG. 2, when the rotation shaft 18 is inserted, the outer ring side plate 3 forms opposing surfaces at an interval between the flat surfaces 10 and 19 between the bent free end and a base portion. The inner ring inserting portion 14H stretches between the flat surface 19 of the rotation shaft 18 and the flat surface 10 of the inner ring 2 by elastic deformation of the leaf spring portion 15 based on a spring property, so that jerking is eliminated by absorbing a gap generated due to a dimensional tolerance between the rotation shaft 18 and the inner ring 2. As a result, generation of the jerking of rotational motion is prevented, so that accurate drive transmission can be made. Further, a frictional force acts between the leaf spring portion 15 and the flat surface 19, and therefore even when a snap-fit engaging portion (hooking claw 27: FIG. 10) is not added as in Embodiment 4 described later, the inner ring inserting portion 14H is not readily disengaged from the rotation shaft 18.

As shown in (a) to (d) of FIG. 1, (c) and (d) of FIG. 2, and (a) and (b) of FIG. 4, on the outer peripheral surface of the inner ring 2, the retaining groove portion 11 which is an example of a groove with respect to the circumferential direction and the guide receiving portion 13 which is an example of a standing surface, with respect to the diameter direction, close to the retaining groove portion 11 are formed. The outer ring side plate 3 engages with the retaining groove portion 11 and contacts the guide receiving portion 13. In a state in which the outer ring side plate 3 is mounted and fixed on the inner ring 2, the side plate portion 3a moors one of side surfaces of the outer ring 4, so that the disengagement of the needle 6 incorporated in the one-way clutch 1 is prevented.

The leaf spring guiding portion 12 which is an example of a recessed portion causes the leaf spring base portion 14K as a part of the outer ring side plate 3 to pass along the leaf spring guiding portion 12 until the leaf spring base portion 14K reaches the inner peripheral surface of the inner ring 2 in the same plane with the outer ring side plate 3. The leaf spring base portion 14K is guided by the leaf spring guiding portion 12 ((a) of FIG. 3), so that the side plate portion 3a is movable toward the flange portion 7 side that is more remote therefrom than the retaining groove portion 11. In a state in which the flat surface of the inner ring inserting portion 14H is contacted to the flat surface 10 of the inner ring 2, both free ends of the leaf spring portion 15 elastically contact the flat surface 19 of the rotation shaft 18.

As shown in (a) and (b) of FIG. 3, the flange portion 7 of the inner ring 2 prevents the disengagement of the inner ring 2 in an opposite side with respect to the thrust direction when the inner ring 2 is inserted in the one-way unit 20. The outer ring side plate 3 engages with the retaining groove portion 11. The guide receiving portion 13 abuts against the outer ring side plate 3, so that the outer ring side plate 3 is positioned with respect to the thrust direction. The leaf spring guiding portion 12 holds the leaf spring base portion 14K of the outer ring side plate 3. The outer peripheral surface 8 of the inner ring 2 contacts the needle 6 constituting the inner peripheral surface of the one-way unit 20. The inner peripheral surface 9 of the inner ring 2, into which the rotation shaft 18 as the member-to-be-mounted is inserted, has the flat surface 10.

As shown in (b) of FIG. 5, the side plate portion 3a of the outer ring side plate 3 prevents the disengagement of the needle 6 incorporated in the one-way unit 20. The leaf spring base portion 14K is guided by the leaf spring guiding portion 12 of the inner ring 2. The leaf spring portion 15 is inserted into the inner ring 2 along the flat surface 10.

As shown in (c) of FIG. 3, a plurality of cut-away portions are formed in the inner peripheral surface-side of the outer ring side plate 3, so that guiding portions 16 and locking claws 17 are alternately formed. The locking claws 17 are obliquely bent with respect to a direction opposite from the inner ring inserting portion 14H. The guiding portions 16 are guided by the guide receiving portion 13 of the inner ring 2 when the outer ring side plate 3 is mounted and fixed on the inner ring 2. The guiding portions 16 are guided by the guide receiving portion 13, so that the outer ring side plate 3 is positioned on the inner ring 2. The locking claws 17 are locked by the retaining groove portion 11 of the inner ring 2, so that the outer ring side plate 3 is positionally held and fixed on the inner ring 2 with no jerking. The locking claws 17 constitute a disengagement-preventing stopper (retaining stopper) by being engaged with the retaining groove portion 11 of the inner ring 2.

As shown in (a) of FIG. 5, the inner ring 2 is needled into the one-way unit 20 in an arrow I direction, and then is moved until the flange portion 7 contacts the side surface of the outer ring 4, so that the inner ring 2 is positioned relative to the outer ring 4. Then, as shown in (b) of FIG. 5, the outer ring side plate 3 is inserted into the inner ring 2 in an arrow J direction and thus is fixed on the inner ring 2. At this time, the leaf spring base portion 14K of the outer ring side plate 3 is guided by the leaf spring guiding portion 12 of the inner ring 2, so that the inner ring inserting portion 14H is inserted into the inner ring 2. The inner ring 2 includes the leaf spring guiding portion 12 as a guiding portion for guiding the outer ring side plate 3 so that a phase of the outer ring side plate 3 is regulated in a normal position when the outer ring side plate 3 is mounted on the inner ring 2.

As shown in FIG. 4, the locking claws 17 of the outer ring side plate 3 are finally locked by the retaining groove portion 11 of the inner ring 2, so that the one-way clutch 1 provided with the inner ring 2 as shown in FIG. 1 is completed. As shown in (a) of FIG. 4, the retaining groove portion 11 is engaged with the inner peripheral surface portion of the outer ring side plate 3 at a plurality of positions in a snap-fitting manner.

As described above, the outer ring side plate 3 which is an example of an elastic metal plate member is mounted on the inner ring 2, and limits relative movement between the outer ring 4 and the inner ring 2 with respect to the rotational axis direction. The leaf spring portion 15 is formed by being bent from the outer ring side plate 3 and is elastically deformable with positional deviation between the inner ring 2 and the rotation shaft 18 with respect to a relative rotational direction when the rotation shaft 18 is mounted in the inner ring 2. For this reason, the number of parts (components) of the one-way clutch 1 is reduced, so that the number of assembling steps also becomes small.

(Mounting Around Rotation Shaft)

As shown in (a) of FIG. 2, the end portion of the rotation shaft 18 in the side where the flat surface 19 is formed is inserted into the inner ring 2 of the one-way clutch 1 along the inner peripheral surface 9. In order to realize easy insertion, a free end portion of the rotation shaft 18 is subjected to chamfering as shown in (d) of FIG. 2.

The rotation shaft 18 is inserted into the inner ring 2 in an arrow G direction so that the flat surface 19 of the rotation shaft 18 overlaps with the flat surface 10 of the inner ring 2. In an inserting process, the free ends of the leaf spring portion 15 are flexed (bent) by being pressed by the flat surface 19 of the rotation shaft 18, and the flexed leaf spring portion 15 stretches between the flat surface 10 of the inner ring 2 and the flat surface 19 of the rotation shaft 18 by impact resilience, so that the leaf spring portion 15 absorbs the jerking between the rotation shaft 18 and the inner ring 2. At this time, the frictional force generates with the insertion, and therefore it is possible to confirm that there is no jerking between the rotation shaft 18 and the inner ring 2 on the basis of whether or not there is a response to the frictional force. As a result, it is possible to prevent inclusion of a defective product with the jerking between the rotation shaft 18 and the inner ring 2.

As shown in (c) and (d) of FIG. 2, in a state in which the rotation shaft 18 is assembled with the one-way clutch 1, by the flexure of the leaf spring portion 15, the jerking generated by an engagement error and the gap between the inner ring and the rotation shaft is absorbed.

(Loss-of-Synchronism-Preventing Effect During Actuation of Pulse Motor)

In the one-way clutch 1 in Embodiment 1, the engagement error and the gap between the rotation shaft 18 and the inner ring 2 for permitting easy insertion are absorbed by the leaf spring portion 15, and therefore it is possible to provide a one-way clutch with less backlash. The one-way clutch 1 is free from the jerking between the rotation shaft 18 and the outer ring 4 with respect to the rotational direction, and therefore when the rotation shaft 18 is driven by a pulse motor, the outer ring 4 follows the drive from a first pulse after the actuation of the pulse motor, so that smooth actuation and acceleration can be realized. As a result, in contrast to the case where the jerking with respect to the rotational direction is generated between the rotation shaft 18 and the outer ring 4, quick rotation and acceleration during the actuation are eliminated.

Particularly, an accelerated impact force resulting from a pulse wavelength skip of 2 waves to 20 waves during the actuation of the pulse motor due to the backlash with normal and reverse rotations is not generated. For this reason, loss of synchronism of the pulse motor during the actuation is prevented, so that it became possible to actuate the pulse motor by simultaneously stabilizing many rotation loads.

Originally, a rotational torque is determined by an electromagnetic force, and therefore the pulse motor (stepping motor) is rotated every (one) phase with respect to an angular direction by an attracting force of an electromagnet during low-speed rotation. By acceleration of the first one pulse, with a second pulse, the pulse motor is further accelerated, but can be smoothly actuated and rotated when a load is applied with a force less than an accelerating force. However, when the jerking such as the backlash generates, the pulse does not contribute to actuation acceleration in a period of the jerking, so that an object at rest is abruptly rotated at the instant when the jerking period is ended. At this time, static friction and moment of inertia acts on the pulse motor, and therefore a large torque acts on the pulse motor, so that the pulse motor cannot rotate and thus there is a possibility that the pulse motor causes the loss of synchronism.

As a comparison example, an inserting opening having a D-shaped cross-section mating with the flat surface 19 of the rotation shaft 18 is formed in the inner ring 2 by using the outer ring 4 which is the same as that in Embodiment 1, and then a one-way clutch is assembled using the outer ring side plate 3 including the leaf spring base portion 14K formed by cutting. In this comparison example, there is no leaf spring portion 15, and therefore the jerking with respect to the rotational direction generates between the rotation shaft 18 and the outer ring 14. In the one-way clutch in the comparison example, when the rotation shaft 18 was driven by the pulse motor, the drive starts from the time of several pulses due to a delay resulting from the jerking of angle of rotation, and when there was a load, the pulse motor caused the loss of synchronism.

Other Effects of Embodiment 1

The one-way clutch 1 in Embodiment 1 absorbs the jerking between the rotation shaft 18 and the inner ring 2 with respect to the rotational direction by the leaf spring portion 15 provided on the outer ring side plate 3. For this reason, it is possible to provide the one-way clutch with no jerking between the rotation shaft 18 and the inner ring 2 and with less backlash. Even when the jerking between the rotation shaft 18 and the inner ring 2 is large, the jerking can be absorbed by the leaf spring portion 15 of the outer ring side plate 3, so that it is possible to precisely transmit the power with high responsiveness.

In the one-way clutch in Embodiment 1, as an exchange part due to an end of a durable lifetime, only the metal-made inner ring 2 contacting the needle 6 may be required to be replaced, and the inner ring 2 is demounted from the outer ring 4 of the one-way unit 20 and then a new inner ring 2 can be mounted. For this reason, there is an advantage that the one-way unit 20 can be used again by exchanging only the inner ring 2. When the inner ring 2 is exchanged, compared with a long exchanging operation of the rotation shaft 18, a small work space may only be required to be ensured, so that operativity is good.

In the one-way clutch 1 in Embodiment 1, the rotation shaft 18 is detachably inserted in the inner ring 2 with the frictional force. The leaf spring portion 15 contacts the flat surface 19 of the rotation shaft 18 with a spring force (impact resilience), and therefore mounting and demounting of the one-way clutch 1 relative to the rotation shaft 18 can be executed with an appropriate frictional force. For this reason, the one-way clutch 1 is excellent in operativity of the mounting, the exchange and the like.

In the one-way clutch 1 in Embodiment 1, rigidity of the outer peripheral surface 8 of the inner ring 2 is high, and even when the needle 6 strongly presses the inner ring 2, the needle 6 does not cause biting such that the outer peripheral surface 8 of the inner ring 2 is deformed against a needle pressing force. For this reason, even when a large torque is transmitted between the outer ring 4 and the inner ring 2, one-directional control of the outer ring 4 and the inner ring 2 is smoothly switched by the normal and reverse rotations of the outer ring 4 and the inner ring 2. In the case of a conventional metal rotation shaft, in order to obtain high durability, e.g., a component of about 400 mm in length for a sheet feeding roller rotation shaft of an image forming apparatus was subjected in its entirety to surface hardening, and therefore a manufacturing process was long and thus the component was expensive. However, in the one-way clutch 1 in Embodiment 1, only the inner ring 2 was surface-modified without subjecting the rotation shaft 18 to the surface hardening, so that it was possible to obtain equivalent high durability and thus a manufacturing cost was able to be considerably reduced.

In the case of a conventional one-way unit 20 of a small size of about 6 mm to 20 mm in outer diameter, the one-way unit 20 does not include the inner ring (inner race) 2 in many cases, and therefore the one-way unit 20 cannot be used for the rotation shaft 18 formed in a thin cylindrical shape or formed of the resin material. However, the one-way unit 1 in Embodiment 1 includes the inner ring 2, and therefore in the general-purpose one-way unit of the small size of about 6 mm-20 mm in outer diameter, the inner ring 2 can be used for the rotation shaft 18 formed in the thin cylindrical shape or formed of the resin material. According to Embodiment 1, by using the general-purpose one-way unit 20 of the small size of about 6 mm-20 mm in outer diameter, the number of components including the inner ring 2 is small, so that the one-way clutch 1 can be easily assembled. As the material for the rotation shaft 18, it is possible to use not only the metal material but also the resin material.

The one-way unit 1 in Embodiment 1 has general-purpose properties such that not only the metal-made rotation shaft but also the resin-mode rotation shaft can be used since the rotation shaft 18 does not contact the needle 6. There is no need to take a high accuracy surface property, such that a dimensional accuracy of the outer diameter of the rotation shaft 18 is made high, into consideration, and therefore the rotation shaft 18 can be sufficiently used at an ordinary processing level. Accordingly, by using an inexpensive rotation shaft 18 with low accuracy, it is possible to remarkably reduce a component cost of a final product using many rotation shafts 18.

In the one-way clutch 1 in Embodiment 1, the rotation shaft 18 and the needle 6 are spaced by the inner ring 2, and therefore abrasion (wearing) and fatigue of the rotation shaft 18 do not generate, so that the rotation shaft 18 can be continuously used repetitively. Further, a soft material such as a metal raw material or the resin material does not directly contact the needle 6, and therefore even when the rotation shaft 18 is used for a long time, the outer peripheral surface of the rotation shaft 18 is not abraded. For this reason, even when the rotation shaft 18 which is soft and low in anti-wearing property is used, it is possible to provide a final product having a long durable lifetime. Accordingly, the conventional one-way clutch reached the end of the lifetime thereof when sheet passing of several hundred thousands of A4-sized sheets was made by the image forming apparatus, but by employing the one-way clutch 1 in Embodiment 1, there was no need to replace the rotation shaft 18 with a new rotation shaft in a period of the lifetime of the final product.

As a result, in a sheet feeding mechanism prepared by integrally assembling a large number of rollers and gears into a unit, constraints to design made in consideration of a structure for demounting the long rotation shaft were not imposed on the sheet feeding mechanism. Further, a need to provide the final product such as the image forming apparatus with a path for demounting the sheet feeding mechanism and a space for permitting demounting of the rotation shaft was eliminated. A need to perform a cumbersome operation such that the rotation shaft was demounted from the sheet feeding mechanism and then a new rotation shaft was disposed and returned into the sheet feeding mechanism was eliminated.

The one-way clutch 1 in Embodiment 1 can use rotation shafts 18 having various shaft diameters only by changing a diameter of the inner peripheral surface 9 of the inner ring 2. For this reason, by using an inexpensive standard one-way unit 20 for which a diameter of an inner circumferential envelope circle of the needle 6 is limited to a certain value, it is possible to meet the rotation shafts 18 having the various shaft diameters.

In the one-way clutch 1 in Embodiment 1, in manufacturing, the leaf spring base portion 14K, the inner ring inserting portion 14H and the leaf spring portion 15 are formed using a portion, to be cut away and disposed of, of the outer ring side plate 3, and therefore an amount of the portion to be disposed of becomes small, so that a material cost of the outer ring side plate 3 can be saved. Another member for fixing the inner ring 2 and the rotation shaft 18 is not needed, and there is no need to perform an operation for mounting the above-mentioned another member.

In the mechanism 1 in Embodiment 1, the mounting of the outer ring side plate 3 on the inner ring 2 is made by snap-fit engagement, and therefore an assembling operation is simpler than that in the case of using a screw or an E-ring, and a small number of components may only be required to be used. For this, there is an advantage that the number of components can be reduced and some assembling steps can be omitted by determining specifications in advance such that a part of components for a commercial product is not used. On the other hand, in the commercial one-way clutch, in order to prevent disengagement of the needle 6 in the thrust direction, a doughnut ring which is a thin metal plate similar to the side plate portion 3a is fixed in advance integrally with the outer ring by spot welding or laser welding. That is, the side plate portion 3a has the function of suppressing the disengagement of the needle 6, and therefore the same function is unnecessarily doubled.

Embodiment 2

Figure 6:
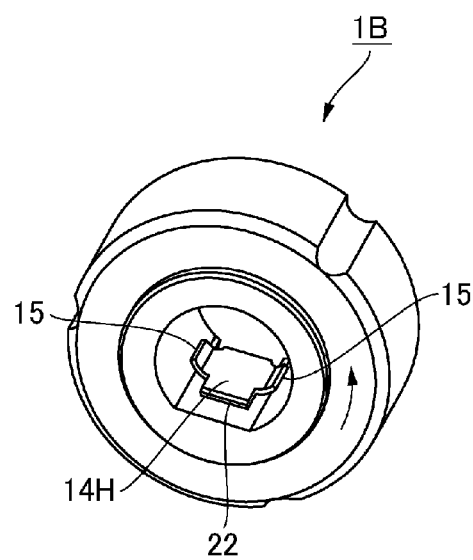
In FIG. 6, (a) and (b) are illustrations of a one-way clutch in Embodiment 2.
Figure 6:
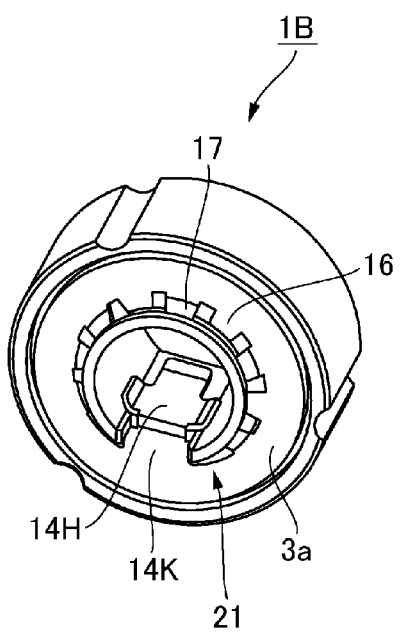
Figure 7:
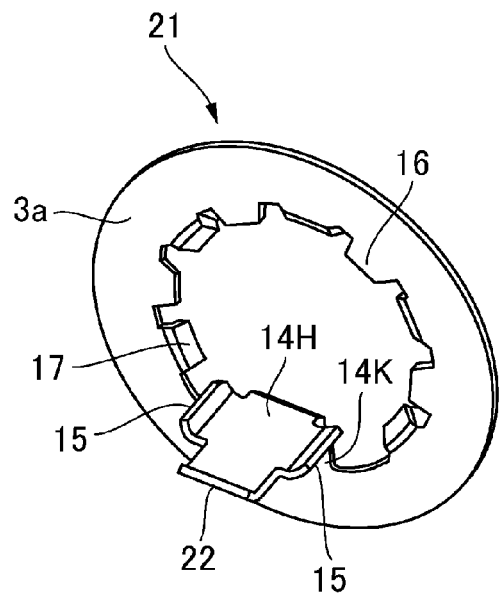
In FIG. 7, (a) and (b) are illustrations of an outer ring side plate in Embodiment 2.
Figure 7:
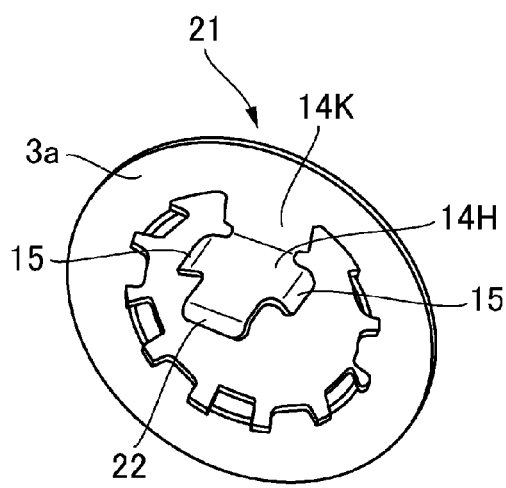

In FIG. 6, (a) and (b) are perspective views of a one-way clutch in Embodiment 2. In FIG. 7, (a) and (b) are perspective views of an outer ring side plate in Embodiment 2.

As shown in (a) of FIG. 6, a one-way clutch 1B in Embodiment 2 is the same as the one-way clutch 1 in Embodiment 1 except that an inner ring inserting portion 14H includes a leaf spring portion 22 at a free end portion thereof. For this reason, in the following description, constituent elements identical to those in Embodiment 1 are represented by reference numerals or symbols common to FIGS. 1 to 7 and will be omitted from redundant description.

As shown in (a) and (b) of FIG. 1, in Embodiment 1, the leaf spring portion 15 was provided at each of end portions of the leaf spring base portion 14K, with respect to the radial direction, formed by bending an associated portion of the outer ring side plate 3 in the thrust direction (rotational axis direction) of the inner ring 2. As shown in (a) of FIG. 7, in Embodiment 2, in addition to these leaf spring portions 15, a leaf spring portion 22 was formed by bending a free end portion of the leaf spring base portion 14K with respect to the thrust direction (rotational axis direction). The leaf spring portions 15 and 22 were provided at three positions consisting of left and right end portions of the inner ring inserting portion 14H and the free end portion of the inner ring inserting portion 14H with respect to the inserting direction.

As shown in (b) of FIG. 6, an outer ring side plate 21 includes the leaf spring base portion 14K which is extended from a part of the inner peripheral surface of the side plate portion 3a, having the function of preventing the disengagement of the needle 6 (FIG. 4), toward the center of the side plate portion 3a. Then, a free end portion of the leaf spring base portion 14K is bent in the thrust direction (inserting direction of the rotation shaft 18), so that the inner ring inserting portion 14H is formed. The leaf spring portions 15 are formed by bending the left and right end portions of the inner ring inserting portion 14H, and the leaf spring portion 22 is formed by bending the free end portion of the inner ring inserting portion 14H. The leaf spring portions 15 and 22 absorb the dimensional tolerance between the inner ring 2 and the rotation shaft 18, and always maintain an urging (pressing) state against the flat surface 19 of the rotation shaft 18, so that rotational power is transmitted.

At an inner circumferential edge of the side plate portion 3a of the outer ring side plate 21, the guiding portions 16 and the locking portions 17 for mounting and fixing the outer ring side plate 21 on the inner ring 2 are formed. Similarly as in Embodiment 1, as shown in FIG. 4, the guiding portions 16 and the locking portions 17 are engaged with the retaining groove portion 11, so that the outer ring side plate 21 is assembled with the inner ring 2. The insertion of the rotation shaft 18 into the one-way clutch 1B is as described above with reference to FIG. 2.

In Embodiment 2, the leaf spring portion 22 is bent and raised, so that the number of the leaf spring portions 15 and 22 becomes larger than that in Embodiment 1 and thus a torque transmittable from the inner ring inserting portion 14H to the flat surface 19 is increased. By increasing the number of the leaf spring portions 15 and 22, an inserting pressure and a frictional force of the rotation shaft 18 become large, so that even when strong vibration is continued, the leaf spring portions 15 and 22 are not disengaged naturally from the rotation shaft 18. Embodiment 2 can meet larger degrees of load, torque transmission, vibration and external force fluctuation than those in Embodiment 1.

Embodiment 3

Figure 8:
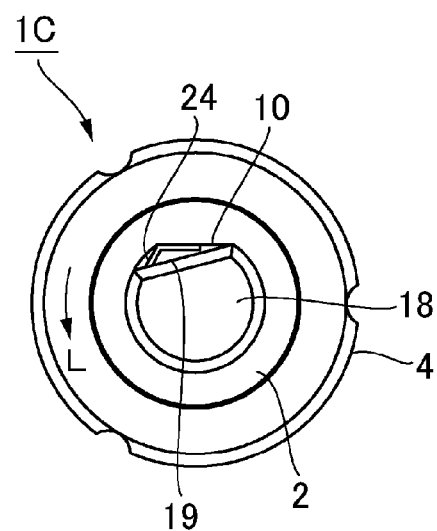
In FIG. 8, (a) to (c) are illustrations of a one-way clutch in Embodiment 3.
Figure 8:
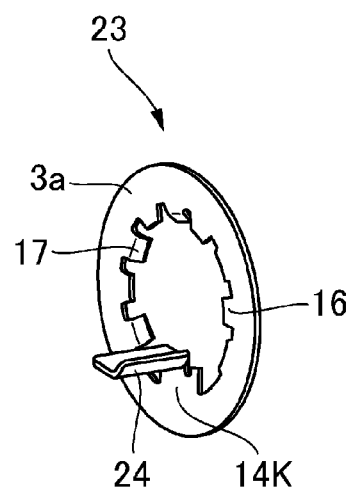
Figure 8:
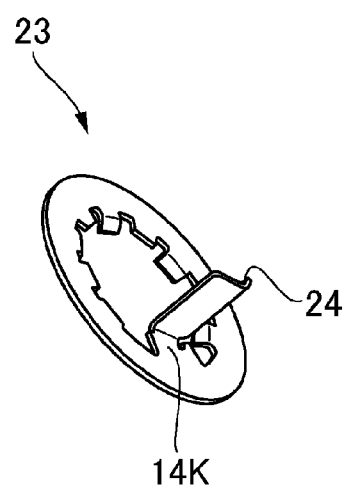

In FIG. 8, (a) to (c) are illustrations of a one-way clutch in Embodiment 3. In FIG. 8, (a) is a front view of the one-way clutch, (b) is a perspective view of an outer ring side plate as seen from a spring plate body side, and (c) is a perspective view of the outer ring side plate as seen from below.

As shown in (a) of FIG. 8, a one-way clutch 10 in Embodiment 3 is the same as the one-way clutch 1 in Embodiment 1 except that an inner ring inserting portion 14H includes a leaf spring portion 24 at a left end portion of left and right end portions thereof. For this reason, in the following description, constituent elements identical to those in Embodiment 1 are represented by reference numerals or symbols common to FIGS. 1 to 5 and 8 and will be omitted from redundant description. Similarly as in Embodiment 1, the inner ring 2 is inserted into the one-way unit 20, and then the outer ring side plate 23 is mounted on the inner ring 2 by the snap-fit engagement, so that the one-way clutch 10 in Embodiment 3 is prepared.

As shown in (b) of FIG. 8, in Embodiment 3, the leaf spring portion 24 was provided only at the right end portion of the leaf spring base portion 14K, extending from the side plate portion 3a toward the center of the outer ring side plate 23, as seen in the thrust direction (inserting direction of the rotation shaft 18).

As shown in (a) of FIG. 8, when the rotation shaft 18 is inserted in the one-way clutch 1C, the right end portion of the flat surface 19 of the rotation shaft 18 directly contacts the flat surface 10 of the inner ring 2 and is held by the flat surface 10 of the inner ring 2. The left end portion of the flat surface 19 of the rotation shaft 18 contacts the leaf spring portion 24, so that the leaf spring portion 24 is flexed to generate a spring force, and thus absorbs the jerking between the rotation shaft 18 and the inner ring 2 with respect to the rotational direction.

Then, the needle 6 (not shown in (a) of FIG. 8) is disposed inside the outer ring 4 so that the one-way clutch 10 transmits the torque from the rotation shaft 18 to the outer ring 4 in an arrow L direction and so that the torque in a direction opposite to the arrow L direction is not transmitted (idling).

One of the end portions of the flat surface 19 of the rotation shaft 18 with respect to the radial direction directly contacts the flat surface 10 of the inner ring 2, and therefore when the torque with respect to the arrow L direction is transmitted, a contact pressure by the direct contact of the one of end portions is increased, so that the torque is directly transmitted from the rotation shaft 18 to the inner ring 2. In the case where the torque with respect to the direction opposite to the arrow L direction acts on the one-way clutch 1C, the one-way clutch 1C is idled, and therefore the pressure of the leaf spring portion 24 is not changed.

The other end portion of the flat surface 19 of the rotation shaft 18 with respect to the radial direction presses the flat surface 10 of the inner ring 2 via the leaf spring portion 24, and therefore the direct contact state of the above-described one of the end portions is always maintained. Even when the torque fluctuation generates, the leaf spring portion 24 is flexed to absorb the jerking with respect to the rotational direction, and therefore the direct contact state of the above-described one of the end portions is not eliminated.

In the one-way clutch 10 in Embodiment 3, the torque is directly transmitted from the flat surface 19 of the rotation shaft 18 to the flat surface 10 of the inner ring 2, and therefore even when strong acceleration and a large load fluctuation are added, the torque can be transmitted at a certain level without delay.

Embodiment 4

Figure 9:
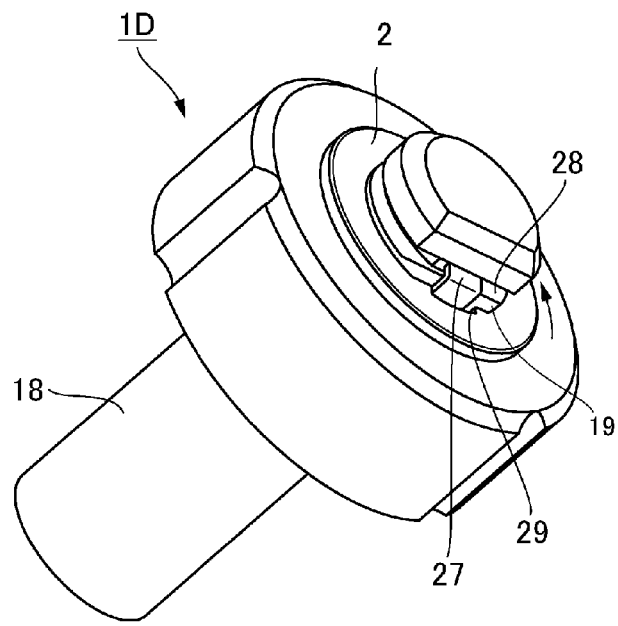
In FIG. 9, (a) and (b) are illustrations of a one-way clutch in Embodiment 4.
Figure 9:
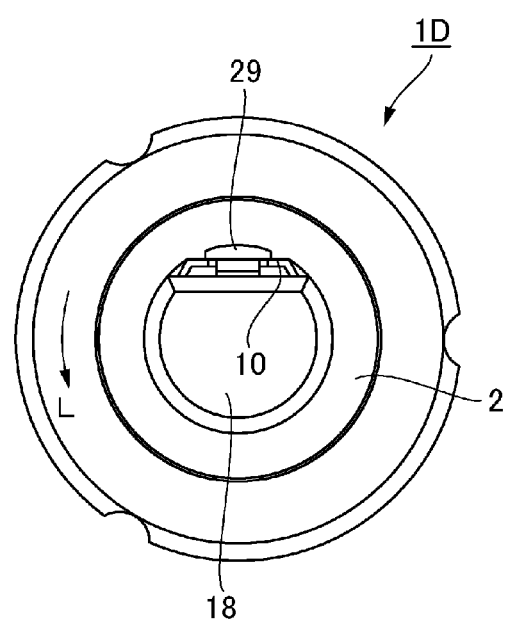

In FIG. 9, (a) and (b) are illustrations of a one-way clutch in Embodiment 4. In FIG. 9, (a) and (b) are illustrations of an outer ring side plate in Embodiment 4.

As shown in (a) of FIG. 9, a one-way clutch 1D in Embodiment 4 is the same as the one-way clutch 1 in Embodiment 1 except that an inner ring inserting portion 14H includes a snap-fit engaging portion at a free end portion thereof. For this reason, in the following description, constituent elements identical to those in Embodiment 1 are represented by reference numerals or symbols common to FIGS. 1 to 5, 9 and 10 and will be omitted from redundant description. Similarly as in Embodiment 1, the inner ring 2 is inserted into the one-way unit 20, and then the outer ring side plate 23 is mounted on the inner ring 2 by the snap-fit engagement, so that the one-way clutch 1D in Embodiment 4 is prepared.

As shown in (a) of FIG. 9, the rotation shaft 18 is assembled with the one-way clutch 1D by being penetrated through the one-way clutch 1D. The rotation shaft 18 is provided with a claw receiving groove portion 28. The claw receiving groove portion 28 is formed through full circumference of the rotation shaft 18 like the groove used when a C-ring is engaged with the groove, but the claw receiving groove portion 28 may also be formed only on the flat surface 19 of the rotation shaft 18. As shown in (b) of FIG. 9, on the flat surface 10 of the inner ring 2, a groove-shaped undercut 29, for the claw, penetrating through the inner ring 2 is provided.

As shown in (a) of FIG. 10, the inner ring inserting portion 14H is formed by bending a free end portion of the leaf spring base portion 14K extending from the side plate portion 3a toward the center of an outer ring side plate 25. As seen from the thrust direction (inserting direction of the rotation shaft 18) of the inner ring inserting portion 14H, left and right end portions of the inner ring inserting portion 14H with respect to the radial direction are bent obliquely upward, so that the leaf spring portions 15 are formed. A hooking claw 27 is formed by bending a free end portion of the inner ring inserting portion 14H, with respect to the thrust direction (depth direction), toward the center axis of the outer ring side plate 25.

As shown in (a) of FIG. 9, when the rotation shaft 18 is inserted into the one-way clutch 1D and then the one-way clutch 1D is moved in the thrust direction, the hooking claw 27 of the outer ring side plate 25 engages with the claw receiving groove portion 28 of the rotation shaft 18 by the snap-fit engagement. As a result, positioning and fixing between the rotation shaft 18 and the one-way clutch 1D are made. The engagement between the hooking claw 27 and the claw receiving groove portion 28 reliably ensures retaining of the one-way clutch 1D around the rotation shaft 18.

As shown in (b) of FIG. 9, the undercut 29, for the claw, of the inner ring 2 constitutes a space (clearance) for flexure of the hooking claw 27 in a process in which the one-way clutch 1D is moved along the rotation shaft 18. The hooking claw 27 projects in a side opposite from the rotation shaft 18 until the hooking claw 27 engages with the claw receiving groove portion 28 by the snap-fit engagement, and therefore the undercut 29 functions as a space in which the projected hooking claw 27 moves.

The one-way clutch 1D in Embodiment 4 includes the hooking claw 27 at the free end portion of the inner ring inserting portion 14H of the outer ring side plate 3. The hooking claw 27 is formed by bending the free end portion of the inner ring inserting portion 14H with respect to the rotational axis direction toward the center axis of the outer ring side plate 25 so that the hooking claw 27 enters the claw receiving groove portion 28 formed on the rotation shaft 18. The movement of the rotation shaft 18 and the inner ring 2 in the thrust direction is limited (prevented) in general by a locking means such as an E-shaped stopper ring or a C-shaped stopper ring. However, according to the constitution in this embodiment, the rotation shaft 18 and the inner ring 2 can be mounted and fixed without using the locking means as a separate member, and therefore there is an advantage that the number of components can be reduced correspondingly. According to Embodiment 4, the one-way clutch 1D can be positioned and fixed around the rotation shaft 18 without mounting the C-ring or the E-ring on the claw receiving groove portion 28. In the case of using the C-ring or the E-ring, there is a need to provide the C-ring or the E-ring at two positions of the rotation shaft 18 so as to clamp the one-way clutch 1D, but according to Embodiment 4, the claw receiving groove portion may only be required to be disposed at one position.

Embodiment 5

Figure 11:
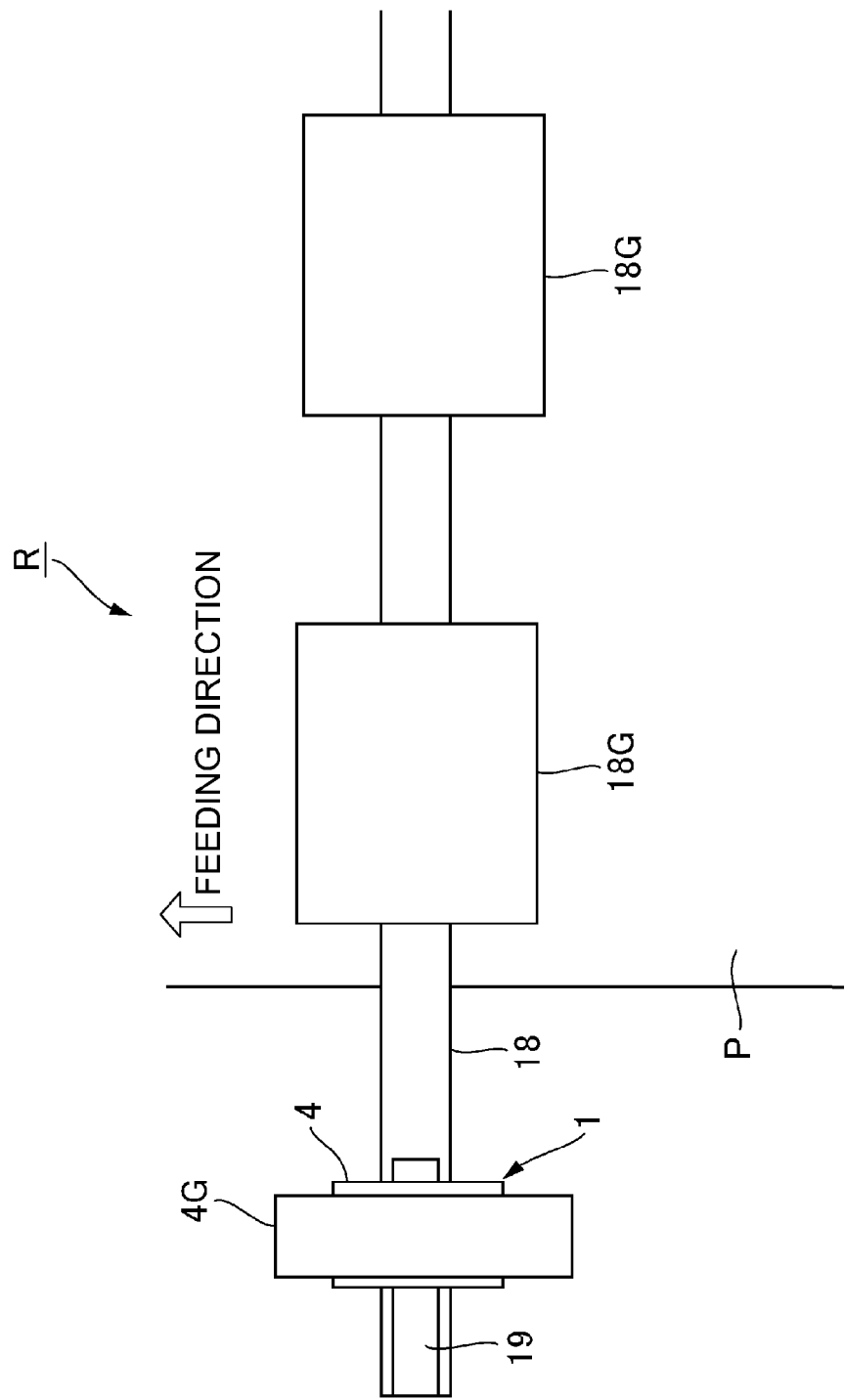
FIG. 11 is an illustration of a sheet feeding roller in Embodiment 5.

FIG. 11 is an illustration of a sheet feeding roller in Embodiment 5.

As shown in FIG. 11, the rotation shaft 18 of a sheet feeding roller R is formed of the resin material, and has the flat surface 19. A rubber roller 18G is fixed around the rotation shaft 18. The rotation shaft 18 is inserted into the inner ring 2 of the one-way clutch 1. A gear 4G is fixed around the outer ring 4 of the one-way clutch 1.

In the sheet feeding roller R in Embodiment 5, the rotation shaft 18 can be manufactured by injection molding by using, as the resin material for the rotation shaft 18, a so-called thermoplastic resin material such as ABS, POM, PC, AS or a composite materials of these resins. For this reason, the rotation shaft 18 in this embodiment can be manufactured inexpensively compared with a rotation shaft of a free-cutting steel plated with nickel and a rotation shaft of a stainless steel material.

Other Embodiments

The present invention can also be carried out other embodiments in which a part or all of constituent elements in the above-described embodiments are replaced with their alternative constituent elements so long as a constitution in which an inner ring is provided so that a plurality of rotatable members do not contact a rotation shaft is employed.

Accordingly, the constitution of the leaf spring portion 15 is not limited to the constitution in which the leaf spring portion 15 is disposed at the end portion of the leaf spring base portion 14K with respect to the radial direction. The leaf spring portion 15 may also be formed by cutting away a central portion of the leaf spring base portion 14K and then by bending and raising a remaining central portion in left and right sides. It is also possible to insert a spring member or the like as another member.

In the one-way clutch according to the present invention, a part of the elastic metal plate member limits the movement of the outer ring in the rotational axis direction by being mounted on the inner ring positions in the gap between the rotation shaft and the inner ring, and limits the positional deviation between the rotation shaft and the inner ring with respect to the relative rotational direction. For this reason, it is possible to suppress the jerking between the inner ring and the rotation shaft with respect to the relative rotational direction inexpensively without providing the jerking-preventing member in dependent of the inner ring.

While the invention has been described with reference to the structures disclosed herein, it is not confined to the details set forth and this application is intended to cover such modifications or changes as may come within the purpose of the improvements or the scope of the following claims.

This application claims the benefit of Japanese Patent Application No. 2014-068281 filed on Mar. 28, 2014, which is hereby incorporated by reference herein in its entirety.

What is claimed is:

1. A one-way clutch comprising:
an inner ring provided with a non-circular inserting opening for permitting insertion of a non-circular portion of a rotation shaft and rotatable integrally with the rotation shaft by being engaged with the rotation shaft;
an outer ring engaged with an outer peripheral surface of said inner ring and rotatable in one direction relative to said inner ring and non-rotatable in a direction opposite to said one direction; and
an elastic metal plate member, provided at one end portion of said inner ring with respect to a rotational axis of said inner ring and engaged with said inner ring, for limiting movement of said inner ring relative to said outer ring in the rotational axis direction of said inner ring,
wherein said elastic metal plate member includes a leaf spring portion, and wherein said leaf spring portion is inserted into the non-circular inserting opening, and when the rotation shaft is mounted, said leaf spring portion is positioned in a gap formed between said inner ring and the rotation shaft with respect to a rotational direction of the rotation shaft to absorb play between said inner ring and the rotation shaft.

2. A one-way clutch according to claim 1, wherein said elastic metal plate member has an opposing surface bent from a side portion of said inner ring toward an inside of said inner ring so as to oppose the gap, and wherein said leaf spring portion includes a bent portion obtained by bending end portions thereof, with respect to a widthwise direction of the opposing surface of said elastic metal plate member perpendicular to a rotational axis direction of the rotation shaft, toward a center of said inner ring.

3. A one-way clutch according to claim 1, wherein said inner ring includes a guiding portion for guiding said elastic metal plate member so that a phase of said elastic metal plate member is regulated at a normal position when said elastic metal plate member is engaged with said inner ring.

4. A one-way clutch according to claim 1, wherein said inner ring includes a flange portion for limiting the movement of said outer ring in a rotational axis direction of the rotation shaft in a side opposite with respect to the rotational axis direction of the rotation shaft from a side where said elastic metal plate member is engaged.

5. A one-way clutch according to claim 1, wherein the rotation shaft has a rotation shaft flat surface formed by partly flattening a circumferential surface thereof, wherein said inner ring has an inner ring flat surface formed by partly flattening a circumferential surface thereof engageable with the circumferential surface of the rotation shaft, and wherein the gap is formed between the rotation shaft flat surface and the inner ring flat surface.

6. A sheet feeding roller comprising:
a rotation shaft formed of a resin material;
a one-way clutch according to claim 1, in which said rotation shaft is inserted;
a gear fixed around said outer ring of said one-way clutch; and
a rubber roller fixed around said rotation shaft.

* * * * *